United States Patent [19]

Wetzig

[11] 4,088,911
[45] May 9, 1978

[54] ELECTRIC UNIPOLAR MACHINE

[75] Inventor: Dieter Wetzig, Berlin, Germany

[73] Assignee: Siemens Aktiengesellschaft, Munich, Germany

[21] Appl. No.: 711,865

[22] Filed: Aug. 5, 1976

[30] Foreign Application Priority Data

Aug. 20, 1975  Germany .............................. 2537548

[51] Int. Cl.² .......................................... H02K 31/00
[52] U.S. Cl. ..................................... 310/178; 310/52; 310/114; 310/219
[58] Field of Search ................ 310/178, 219, 232, 10, 310/40, 52, 112, 114; 322/48

[56] References Cited

U.S. PATENT DOCUMENTS

| 1,184,224 | 5/1916 | Breslauer | 310/178 |
| 3,644,766 | 2/1972 | Hughes | 310/40 |
| 3,831,049 | 8/1974 | Korotenko | 310/178 |
| 3,846,653 | 11/1974 | Korotenko | 310/178 |

FOREIGN PATENT DOCUMENTS

| 886,742 | 10/1943 | France | 310/178 |
| 2,409,796 | 9/1974 | Germany | 310/178 |
| 2,414,088 | 10/1974 | Germany | 310/178 |
| 408,426 | 12/1973 | U.S.S.R. | 310/178 |
| 371,649 | 2/1973 | U.S.S.R. | 310/178 |

OTHER PUBLICATIONS

Homopolar Generator to Excite Synchrocyclotron at Carnegie Tech. (3 pages), 11/1949.

*Primary Examiner*—R. Skudy
*Attorney, Agent, or Firm*—Kenyon & Kenyon, Reilly, Carr & Chapin

[57] ABSTRACT

An electric unipolar machine is disclosed which comprises two rotating cylinders disposed one behind the other in an axial direction. The aforesaid rotating cylinders are surrounded by respective stationary cylinders and are connected thereto by sliding contacts.

In accord with the invention, a rotor hub which has a central recess and which is divided at a point along the axial direction is provided for supporting the rotating cylinders. The stationary cylinders, in turn, are supported by a housing which is also divided, but along a point in the circumferential direction. In further accord with the invention, the winding of the machine is arranged in the central recess of the rotor hub and is formed as a one-piece ring. Additionally, the winding is supported by means extending through the parting gap of the divided housing and is aligned and fastened by bolts distributed around the circumference of the housing.

6 Claims, 2 Drawing Figures

ELECTRIC UNIPOLAR MACHINE

BACKGROUND OF THE INVENTION

1. Field of the Invention

The invention relates to an electric unipolar machine and, in particular, to a motor.

2. Description of the Prior Art

In the "Proceedings of the IEEE," January 1973, pages 103 and 104 there is disclosed an electric unipolar machine in which two rotating cylinders are disposed one behind the other in the axial direction and are arranged in an insulating manner on a shaft. The aforesaid rotating cylinders are surrounded by two corresponding stationary cylinders and a DC current-carrying field winding is provided which has a smaller diameter than that of the cylinders. Sliding contacts, particularly sliding liquid contacts, are also provided for connecting the respective stationary and rotating cylinders to each other. In the abovedescribed unipolar machine, since the stationary field winding is located in the axial center of the machine and is of a diameter smaller than that of the rotating cylinders, the support structure for the rotating cylinders is required to have a bell-shaped body which is supported on one side by the rotating shaft. With such an asymmetrical configuration for the support structure, one-half the torque is developed at each of the rotating cylinders so that an undesirable resultant force distribution is obtained.

It is an object of the present invention to design a unipolar machine of the above type in such a manner that the forces that are developed in the machine can be taken up in a simple manner without adversely affecting the assembly of the individual parts.

SUMMARY OF THE INVENTION

In accordance with the principles of the present invention, the above and other objectives are accomplished in a unipolar machine of the above type by supporting the rotating cylinders of the machine on a rotor hub which has a central recess and is centrally divided at a point along the axial direction. The housing supporting the stationary cylinders is also divided, but at a point along the circumferential direction. The field winding, in turn, is arranged in the central recess of the rotor hub and is formed as a one-piece ring. The latter is supported by means extending through the respective gap between the divided housing segments and is aligned and fastened by bolts distributed around the circumference of the housing and ring.

With the above configuration for the unipolar machine, the rotor hub or body is of symmetrical design and permits each rotating cylinder to be supported directly on the shaft. Because of the parting gap at the axial center of the rotor hub between the hub segments, the stationary field winding can be inserted between the two rotor segments without difficulty and the segments can then be joined to each other and the shaft inserted. The rotor thus completed can then be placed in the lower part of the housing with the field winding being supported through means extending through the parting gap of the housing. The exact alignment of the field winding is then accomplished, after the rest of the housing parts are assembled, by the bolts arranged around the circumference of the housing.

As can be appreciated, the design of the unipolar machine in accordance with the invention is completely independent of whether several cylinders are arranged concentrically to each other or whether, instead of the continuous cylinders formed of electrically highly conductive metal, distributed conductors in the manner of a winding are provided. In addition, the field winding can be divided into two concentric field subwindings which have different diameters, are arranged concentrically to each other and between which are arranged the sliding contacts, the latter now being located in a region of reduced or zero field strength.

In a further aspect of the invention, a tube is arranged at the support point of the field winding in the parting gap of the housing for carrying the electrical leads of the field winding. As the field winding is generally designed as a superconducting winding in order to obtain a large amount of power from the unipolar machine and is combined with its cryostat in one structural unit, the coolant feed line for the winding may also be brought through the aforesaid tube or through a similar tube located on the opposite side of the parting gap.

BRIEF DESCRIPTION OF THE DRAWINGS

The above and other features and aspects of the present invention will become apparent upon reading the following detailed description in conjunction with the accompanying drawings, in which.

DETAILED DESCRIPTION

Figure 1:
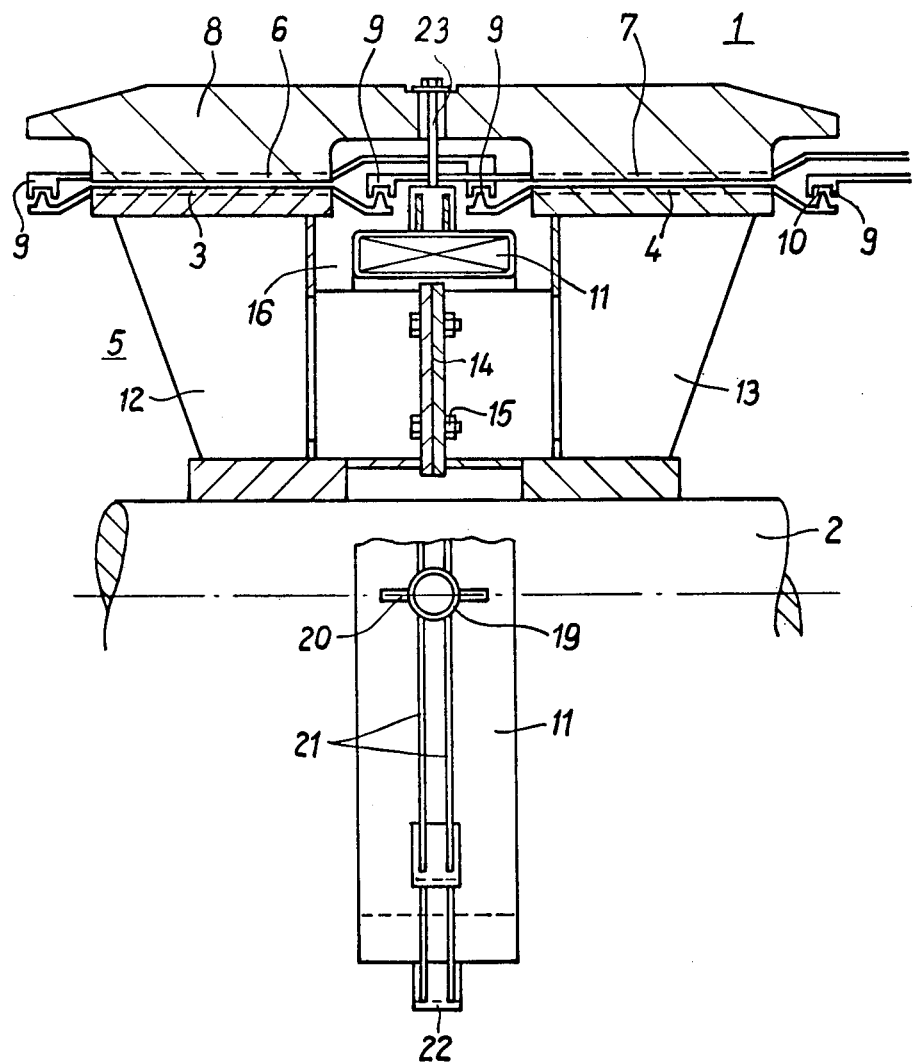
FIG. 1 shows a longitudinal cross section of a unipolar machine in accordance with the principles of the present invention.

FIG. 1 shows an electric unipolar machine 1 in accordance with the principles of the invention. The machine 1 may be used as a motor in ship propulsion and includes current-carrying parts in the form of cylinders. More particularly, the rotating member of the machine driven by the shaft 2 comprises two cylinders 3 and 4 which are arranged one behind the other in the axial direction and are fastened in insulated fashion to a rotor hub 5. The rotating cylinders 3 and 4 are surrounded by two corresponding stationary cylinders 6 and 7, which are likewise arranged one behind the other in the axial direction. The stationary cylinders 6 and 7 are arranged in a likewise stationary housing 8 and are connected to the rotating cylinders 3 and 4 via sliding liquid contacts 9. The latter are indicated only schematically in the drawing and each has a circular channel 10 which is filled with an electrically conductive metallic liquid. Although not shown, additional lateral sealing means may be provided to prevent the metallic liquid from escaping from the circular channel 10 of the contacts 9.

A field winding 11 is provided for generating the magnetic field of the unipolar machine 1. The winding 11 is arranged at the axial center of the machine and is of a diameter smaller than that of the rotating cylinders 3 and 4 and the liquid contacts 9. As shown, the winding 11 is further designed as a superconducting field winding and is located in a cryostat, with which it forms a single structural unit.

The rotor hub 5 of the machine 1 is centrally divided at a point along the axial direction and, thus, comprises two symmetrical hub segments or halves 12 and 13, which are held together at their parting gap 14 by screws 15. The hub 5 is also shaped so as to form a central recess 16, in which the field winding 11 is disposed. The housing 8 of the stationary part is also divided, but at a point along the circumferential direction, so as to form a parting gap 17 at the height of the center of the shaft 2.

Figure 2:
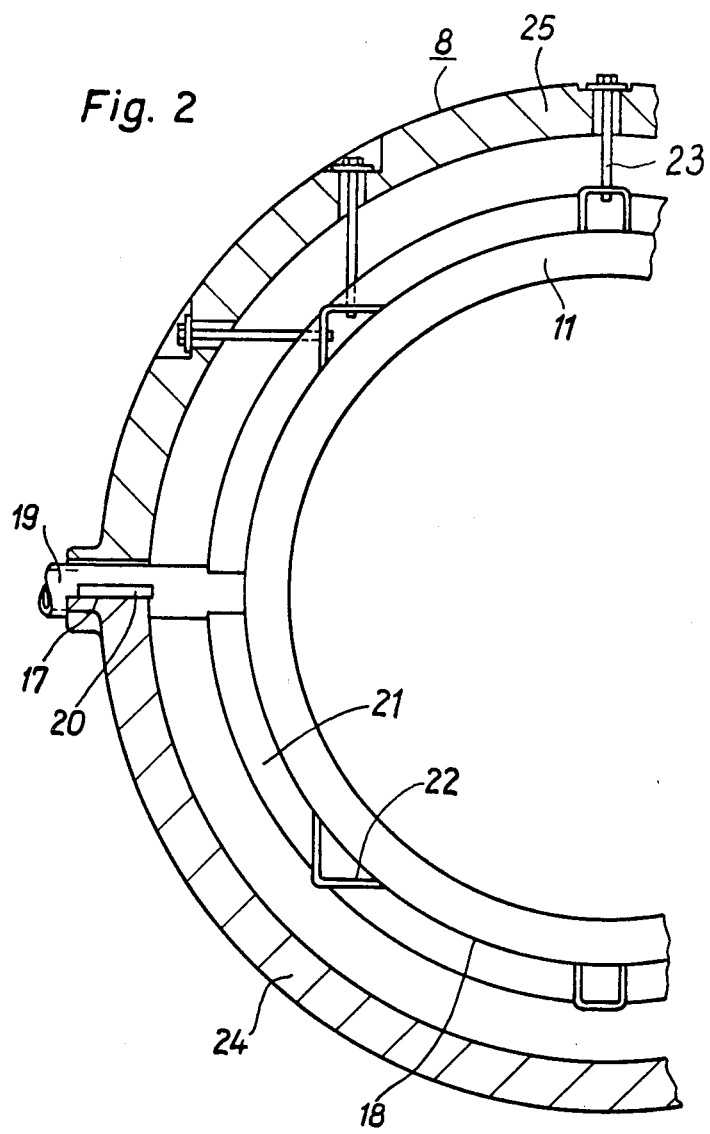
FIG. 2 shows a radial cross section through the housing and field winding of the machine of FIG. 1

As shown more clearly in FIG. 2, a tube 19 is provided for carrying the electrical leads and the coolant line to the field winding 11, which is in the form of a one-piece ring. The tube 19 extends from the outer cylinder surface 18 of the field winding 11 through the parting gap 17 to beyond the outside of the housing 8. At the latter, the tube is provided with lateral plates 20, by means of which the portion of the field winding adjacent the parting gap 17 is supported. In addition, further support for the field winding is realized through two stiffening rings 21 arranged on the outer cylinder surface 18 of the field winding 11. Between these rings, distributed along the circumference of the winding, angular parts 22 having tapped holes are arranged. Bolts 23 are screwed into the latter parts and fastened to the housing 8, thereby providing rigid support of the winding 11.

As can be appreciated, the present unipolar machine 1 can be assembled easily without any substantial difficulty. More particularly, the field winding 11, together with the cryostat surrounding it, is placed in the recess 16 of the segment 12 of the rotor, and the segment 13 of the rotor is fastened to the segment 12 by means of the screws 15. After insertion of the shaft 2, the completed rotor hub 5 with the shaft 2 and the field winding 11 is now placed in the lower part 24 of the housing, being supported by the plates 20. The housing 8 is then closed by mounting the upper half 25 of the housing. Finally, the field winding 11 is accurately aligned relative to the rotor by means of the bolts 23.

What is claimed is:

1. An electric unipolar machine comprising:

two rotating cylinders arranged one behind the other along an axial direction;

two stationary cylinders each arranged to surround one of said rotating cylinders;

sliding contacts for connecting the stationary and rotating cylinders;

a rotor hub for supporting the rotating cylinders, said hub having a central recess and being centrally divided at a point along the axial direction;

a housing for supporting the stationary cylinders, said housing being divided at a point along the circumferential direction;

a current-carrying field winding having a diameter smaller than that of said cylinders, said winding being disposed in said recess;

and means for supporting said winding.

2. A machine in accordance with claim 1 in which:

said winding is in the form of a one-piece ring; and said means for supporting includes means extending through the gap formed by said divided housing and means distributed around the circumference of said divided housing.

3. A machine in accordance with claim 1 in which:

said means extending through said gap includes a tube for carrying the electrical leads of said field winding.

4. A machine in accordance with claim 3 in which:

said field winding is a superconductive winding surrounded by a cryostat whose coolant feed line is carried by said tube.

5. A machine in accordance with claim 1 in which:

said field winding is divided into two concentric field subwindings with different diameters;

and said sliding contacts are arranged between said subwindings.

6. A machine in accordance with claim 1 in which:

said sliding contacts are sliding liquid contacts.

* * * * *